Sept. 28, 1965   J. D. NESBITT ETAL   3,208,740
HEATING APPARATUS
Original Filed Jan. 6, 1961   2 Sheets-Sheet 1

INVENTORS:
JOHN D. NESBITT,
HERBERT M. KOHN.
BY Alfred L. Patmore, Jr.
Thomas A. Meehan
ATTORNEYS.

Sept. 28, 1965   J. D. NESBITT ETAL   3,208,740
HEATING APPARATUS

Original Filed Jan. 6, 1961   2 Sheets-Sheet 2

INVENTORS:
JOHN D. NESBITT,
HERBERT M. KOHN.
BY
Alfred L. Patmore, Jr.
Thomas A. Meehan
ATTORNEYS.

United States Patent Office 3,208,740
Patented Sept. 28, 1965

3,208,740
HEATING APPARATUS
John D. Nesbitt and Herbert M. Kohn, Toledo, Ohio, assignors to Midland-Ross Corporation, Toledo, Ohio, a corporation of Ohio
Original application Jan. 6, 1961, Ser. No. 81,118, now Patent No. 3,116,915, dated Jan. 7, 1964. Divided and this application Oct. 11, 1963, Ser. No. 315,493
4 Claims. (Cl. 263—6)

This application is a division of our prior application Serial No. 81,118, filed January 6, 1961, now U.S. Patent 3,116,915.

This invention relates to heating apparatus found to have particular utility in low temperature processing applications up to the 1200° F. to 1400° F. range wherein temperature uniformity requirements are especially severe as, for example, glass tempering lehrs. Because of the well known fragility of glass and similar products and the necessity of obtaining uniform heating of glass to avoid residual stresses and strains, direct convection heating has been avoided. Normal practice has been to utilize indirect radiant heating elements of the electrical or fuel-fired type with or without the use of some auxiliary convection heating. In the specific case of heat treating glass sheets supported on a moving conveyor, previous designs commonly employed electric heating elements mounted on the lehr side walls. The inherent difficulty with this type of heating is that the electric heating elements become localized sources of heat, and the wall area between elements is much colder and presents a non-uniform temperature radiating area to the glass.

In cases where fuel fired radiant tubes have been used in heat treating glass and similar fragile materials, the problem of obtaining temperatures uniformity becomes more severe than in using electric heating elements. Not only is there a problem of cooler wall areas between tubes or heating elements, but there is also a problem of non-uniform heating along the length of the individual tubes. This problem is greatly accentuated when it is necessary to locate the tubes transversely of the work, i.e., across the width of the moving sheet so that the temperature non-uniformity of the tubes is reflected from edge to edge of the work.

Direct firing for heating glass and similar materials is usually avoided even though the products of combustion are not deleterious to the work because the individual burners produce hot spots which cause a greater temperature non-uniformity than electric or fuel-fired radiant tubes.

It is, therefore, an object of the present invention to provide a combustion system enabling a high degree of turn-down without affecting temperature uniformity.

Another object of the invention is to provide a combustion system capable of producing a uniform source of radiant heat while simultaneously providing a means of limited convection heating.

The application of the ported tube—excess-air burner combination to low temperature processing equipment such as glass lehrs permits the production of a radiant wall having a temperature uniformity heretofore unobtainable by other heating methods. The ported distribution tubes are arranged along the side walls of the chamber with ports located so as to discharge products of combustion to the side wall portions between the tubes. The impingement of the flue products on the wall surfaces between the tubes produces an overall temperature uniformity particularly advantageous for critical processing. The relatively slow movement of the thoroughly mixed combustion products moving off the walls adds a moderate convection heating effect which is better than that produced in the usual direct fired furnace because of the large amounts of excess-air and the elimination of hot spots attendant with the usual direct firing.

Other and more specific objects of the invention will be apparent from the following specification and accompanying drawings, wherein like numbers are used throughout to identify like parts.

Figures 1, 2:
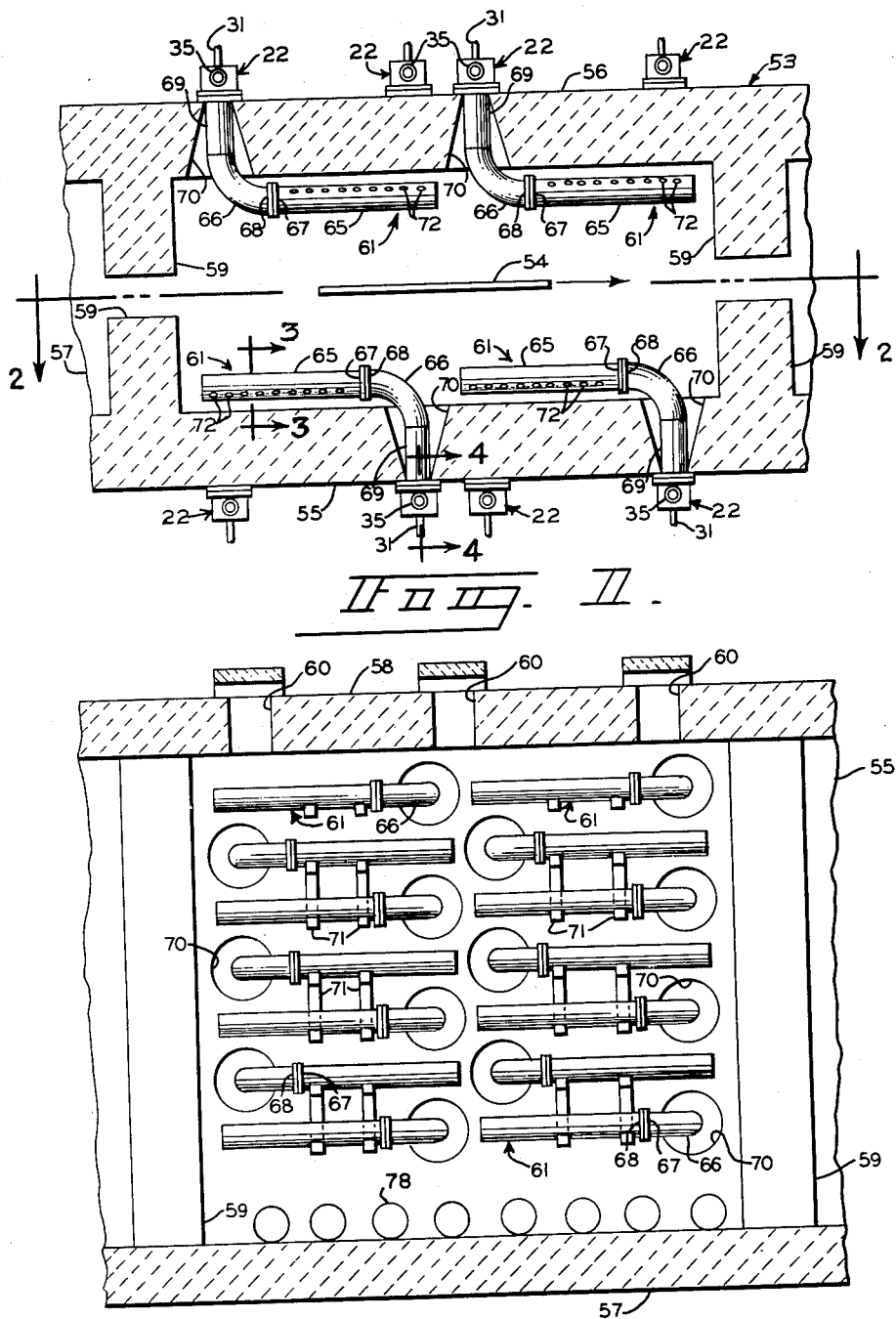
FIG. 1 is a fragmentary horizontal sectional view of a glass tempering furnace.
FIG. 2 is a vertical sectional view taken along the line 2—2 of FIG. 1.

Referring now to FIG. 1, there is shown a representative application of the invention for low temperature processing in the form of a typical section of a multiple section tempering lehr 53 of the vertical type wherein a glass sheet 54 moves therethrough in the direction of the arrow. More particularly, the glass sheet 54 is maintained in a vertical position by a suitable device, such as an overhead conveyor (not shown), located exteriorly of the furnace 53, or the glass sheet may be conveyed through the furnace on rollers 78, as shown in FIG. 2, assisted by guide means (not shown). A portion of this conveyor extends through a suitable slot (not shown) in the top of the furnace 53 to engage the glass sheet 54.

The furnace or lehr 53 comprises a plurality of similar sections, each of which has a front wall 55 and a similarly contoured rear wall 56 spaced therefrom as shown in FIG. 1 with a bottom wall 57 and a top wall 58 as shown in FIG. 2. Two pairs of end walls 59 extend from the front wall 55 and the rear wall 56 toward the center as shown in FIG. 1. The end walls 59 divide the furnace 53 into a plurality of zones, and a suitable opening is provided between each pair of end walls 59 to enable the glass sheets 54 to be moved from one zone to another. Each successive zone has a temperature that is higher than the preceding zone so that the glass sheets 54 are heated progressively to the proper temperature for tempering. Thus adjacent zones are in open communication with one another but are maintained at different temperatures. Flues 60 are provided in the wall 55 and rear wall 56 to remove the products of combustion from the furnace 53, and each flue is connected to an exhaust fan (not shown).

Figure 4:
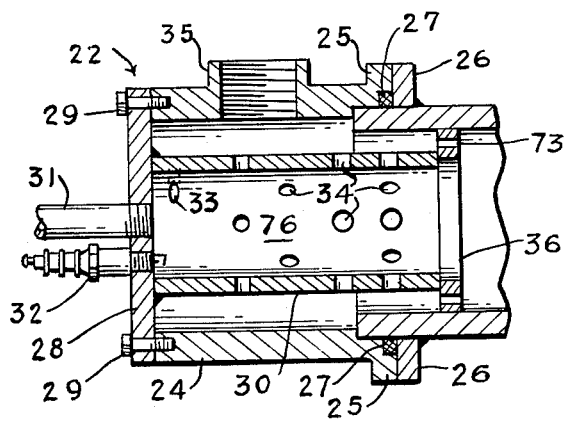
FIG. 4 is a sectional view taken along line 4—4 of FIG. 1.

According to the present invention, four vertical rows of horizontally disposed tubes 61 are mounted within each section of the furnace 53 two rows being located adjacent the front wall 55 and the other two rows being located adjacent the back wall 56 as shown in FIGS. 1 and 2. The combustion tubes 61 are connected to a plurality of burners 22 (FIG. 1) mounted exteriorly of the furnace 53. Each of the burners 22 is of the excess air type and the preferred burner embodiment is shown in FIG. 4. Combustion air is supplied through a line (not shown) to the burner air inlet 35 at a substantially constant rate while a stream of fuel is supplied through a conduit 31.

As can be seen in FIG. 1, each of the combustion tubes 61 includes a substantially straight, elongated portion 65 that is connected to one of the burners 22 through a curved portion or elbow 66 that is in fluid communication with both the burner 22 and the straight portion 65. More particularly, each straight portion 65 has a flange 67 that is secured to a mating flange 68 on the curved portion 66 by any suitable manner. Each of the curved portions 66 is connected to its respective burner 22 by a substantially straight neck section 69 that is located within a conical shaped passage 70 in the wall 55.

Each of the tubes 61 is supported by a pair of brackets 71 which are secured to the inside surfaces of the front wall 55, and rear wall 56. As shown in FIG. 2, each pair of brackets 71 preferably mounts two tubes 61 on the furnace 53. The directions in which the straight portions 65 extend are staggered as shown in FIG. 2 to balance any temperature gradients that might exist along the tubes 61.

Figure 3:
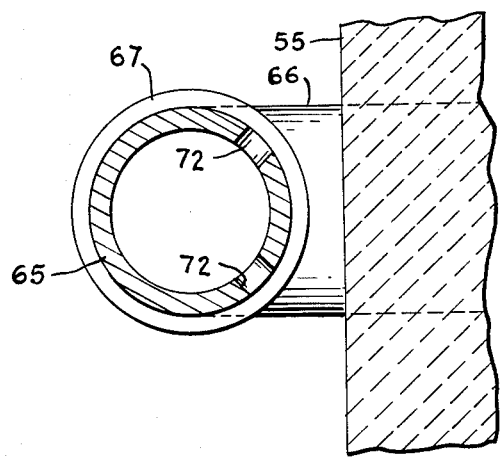
FIG. 3 is a sectional view taken along line 3—3 of FIG. 1.

Each straight portion 65 has a plurality of outlets or ports 72 in communication with the interior of the furnace 53, and the products of combustion from each burner 62 which move through the curved portion 66 and the straight portion 65 are introduced into the furnace 53 through the ports 72. As shown in FIG. 3, the ports 72 are positioned on the side of the straight portion 65 that is toward the lehr wall and the ports 72 extend radially outwardly through the walls of each combustion tube 61 at an angle of approximately 45 degrees from a plane extending through the center of the tube normal to the lehr wall. Thus, the hot products of combustion are directed toward the inner surface of the lehr wall to heat the same uniformly between combustion tubes 61, and wall and tubes become a source of uniform radiant heat. The hot gases which are deflected away from the walls become a source of moderate convection heating.

The excess-air burner of FIG. 4 used to supply products of combustion to the lehr of FIGS. 1 and 2 is similar in construction and operation to the excess-air burner described in the parent application to this application, now issued as U.S. Patent 3,116,915 and, more particularly, the burner of FIG. 3 of the patent which is used to supply products of combustion to the make-up air heater of FIGS. 1, 2 and 4 of the patent. The primary difference between the burner of FIG. 4 of the application and the burner shown in FIG. 3 of U.S. Patent 3,116,915 is that the sleeve 77 and associated slots 78 of the patented burner have been eliminated in the burner shown in FIG. 4 of the present application, and an apertured plate 36 has been substituted. Plate 36 is placed on the downstream end of cylindrical wall portion 30 and is provided with a plurality of spaced, axially extending passages 73 into the annular air chamber. These passages provide an axial flow of cool air adjacent the inside diameter of the flue products distribution tube 23 which encloses the burning air-fuel mixture and reduces to a marked degree the tendency of the elbow 66 downstream of the burner to overheat. Elbow sections are particularly vulnerable to overheating because of the abrupt change in direction of the burning air-fuel mixture which causes additional mixing and faster burning at that point. The provision of this novel cool air blanket is considered a novel improvement over the art and is readily adaptable to many different types of burners employed in a critical heating process.

By using an excess-air type burner in the tempering furnace 53, a substantially constant volume of gas is emitted from each burner 22 even during turndown when no heat is required, because the flow of air in each line 35 is kept constant. Not only is the temperature of the various tubes maintained quite uniform, but also each tube is uniformly heated from end to end. While various sizes and spacings may be used for the outlets 72, those outlets must be angularly directed toward the wall 55 for proper heating. The greater the number of outlets used, the more uniform will be the heat distribution. The total flow of air within each zone is maintained both high and constant which is important where adjacent zones are in open communication with each other, as shown in FIG. 1, and particularly when such zones are controlled at different temperatures.

While the preferred embodiment of the invention has been disclosed, various modifications can be made to the tube and excess air burner without departing from the spirit of the invention or the scope of the subjoined claims.

We claim:

1. In a glass tempering lehr of the type having oppositely disposed side walls and means for conveying glass sheets therethrough in a vertical position, the improvement comprising; a plurality of burners mounted exterior of the furnace, combustion air supply means for delivering a stream of combustion air to each of said burners at a substantially constant rate, fuel supply means for delivering a stream of fuel to each of said burners, and a plurality of combustion tubes mounted within the furnace between the path of movement of the glass sheets and the side walls, each of said tubes having a substantially straight portion extending parallel to the path of movement of the glass sheets and a curved portion in fluid communication with one of said burners, said substantially straight portion having a plurality of outlets in fluid communication with the interior of the furnace whereby products of combustion from said burner are transferred through said curved portion into the furnace through said plurality of outlets.

2. Apparatus according to claim 1 wherein said plurality of said outlets are directed toward said side walls whereby the side walls and combustion tubes become a source of substantially uniform radiant heat and products of combustion are deflected away from the side walls to become a source of convection heating.

3. In a longitudinally extending furnace having wall means forming a work chamber and means for conveying work to be treated therethrough in a predetermined path within said chamber, the improvement comprising: a plurality of nozzle mixing excess air burners mounted exteriorly of said chamber; combustion air supply means for delivering a stream of air to each of said burners at a substantially constant rate; fuel supply means for delivering a stream of fuel to each of said burners; and a plurality of combustion tubes mounted within said chamber between said predetermined path and at least a portion of said wall means which is located parallel to said predetermined path, each of said combustion tubes having first portion extending substantially parallel with said portion of said wall means and a connecting portion in fluid communication with one of said burners, said first portion having a plurality of outlets directed toward said portion of said wall means whereby products of combustion are distributed through said combustion tubes and outlets therein and impinge against said portion of said wall means whereby said portion of the wall means and the combustion tubes become a source of substantially uniform radiant heat, and products of combustion are deflected away from said portion of said wall means to become a source of moderate convection heating.

4. In a longitudinally extending furnace having oppositely disposed substantially parallel side walls and means for conveying work to be treated therethrough in a predetermined path between said side walls, the improvement comprising: a plurality of nozzle mixing excess air burners mounted exteriorly of the furnace; combustion air supply means for delivering a stream of air to each of said burners at a substantially constant rate; fuel supply means for delivering a stream of fuel to each of said burners;

and a plurality of combustion tubes mounted within the furnace between said predetermined path and said side walls, each of said combustion tubes having a first portion extending substantially parallel with said side walls and a connecting portion in fluid communication with one of said burners, said first portion having a plurality of outlets directed toward an adjacent side wall whereby products of combustion are distributed through said combustion tubes and outlets therein and impinge against said side walls whereby the side walls and combustion tubes become a source of substantially uniform radiant heat, and products of combustion are deflected away from the side walls to become a source of convection heating.

References Cited by the Examiner

UNITED STATES PATENTS

| | | | |
|---|---|---|---|
| 1,380,102 | 5/21 | Horn | 263—6 |
| 1,574,839 | 3/26 | Morse | 126—91 |
| 2,486,018 | 10/49 | Furkert | 158—7 |
| 3,100,632 | 8/63 | Mohring | 126—91 |

FOREIGN PATENTS 572,036   5/34   France.

CHARLES SUKALO, *Primary Examiner.*

JOHN J. CAMBY, *Examiner.*